Oct. 24, 1950   F. T. COLSEN   2,526,617
MULTIPLE TOOLHOLDER
Filed May 31, 1947
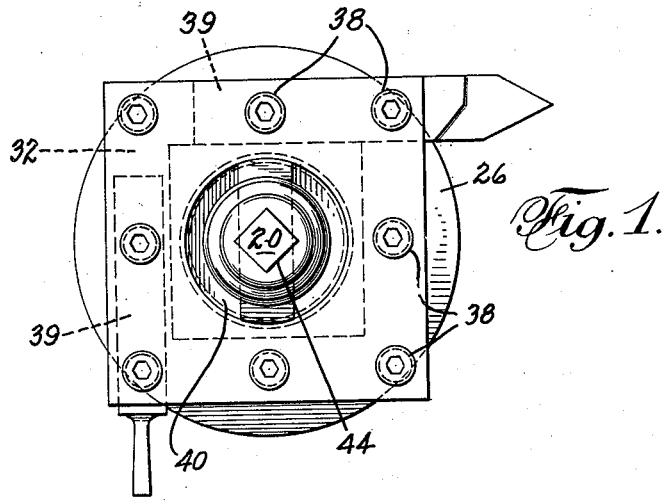
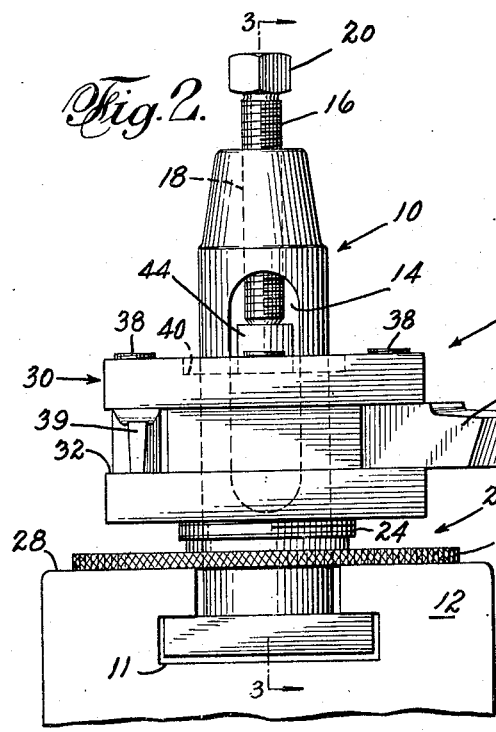
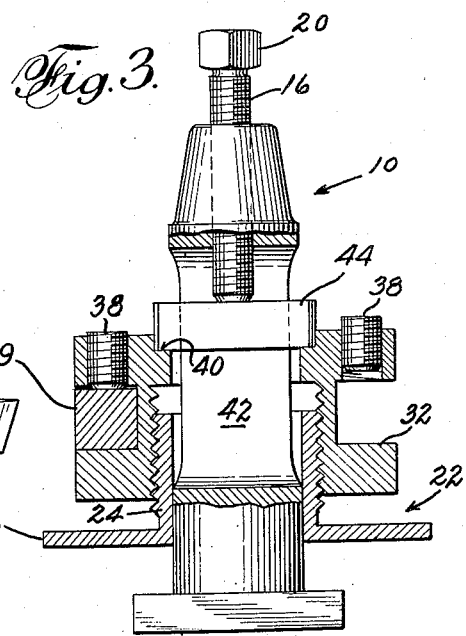
Inventor
FRANK T. COLSEN
By C. G. Stratton
Attorney Patented Oct. 24, 1950

2,526,617

UNITED STATES PATENT OFFICE 2,526,617

MULTIPLE TOOLHOLDER

Frank T. Colsen, Inglewood, Calif.

Application May 31, 1947, Serial No. 751,530

3 Claims. (Cl. 29—48)

This invention relates to a multiple tool holder particularly adapted for use with a tool post of a lathe compound.

An important object of the invention is to provide such a tool holder which may be circumposed on a conventional tool post and employed in conjunction with the prior tightening element of the post.

Other features reside in the rotatability and vertical adjustability of the holder on the post.

A further purpose is to provide a square topped, peripherally grooved, frame of the character described, having a series of individually adjustable mounting screws insertable within said frame so as to selectively retain any of a plurality of tools lodged at diverse angles in said groove and thus separately insertable and removable therefrom.

My invention has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangement of parts, which will more fully appear in the course of the following description. However, the drawings merely show and the following description merely describes one embodiment of the present invention, which is given by way of illustration or example only.

In the drawings, like reference characters designate similar parts in the several views.

Figure 1 is a top plan view of my multiple tool holder mounted on a tool post of a lathe compound and showing two tools clamped therein; Figure 2 is a side elevational view of the tool holder mounted on the tool post; and Figure 3 is a medial vertical sectional view taken through the assembly of Figure 2 partly in elevation.

My multiple tool holder 8 is shown in connection with a conventional tool post 10 mounted in the usual inverted T-slot 11 of a lathe compound 12, the tool post being provided with a horizontal slot 14 through which conventionally a tool is inserted and clamped therein by means of a vertical tightening screw 16 threadedly inserted through a top aperture 18 in the head of the tool post, and provided with an upper polygonal wrench-engaging head or cap 20. Such a tool post obviously can be used only for mounting one tool at a time on the lathe compound, and when it is desired to change tools, even for a short time, the screw 16 must be released, the tool removed from the slot or key-way 14, another one inserted therein and the screw again tightened down.

In contrast, my tool holder may be used to mount a plurality of tools any of which may be used in turn by simply rotating the holder to the desired position and any one of which tools may be individually demounted or substituted for another tool without in the least effecting the mounting of the tools already locked in the holder.

My improved tool holder is centrally apertured so that it may be placed over a conventional tool post as described above, and the pressure screw 16 thereof employed for mounting the same. As illustrated, it is constructed of a lower thimble 22, consisting of an upwardly extending, externally threaded collar portion 24, bearing at its lower extremity an integral, annular flange or disc 26 peripherally knurled and adapted to abut against the upper face 28 of the lathe compound, so as to rotate thereabout when not clamped tight. Said collar, as shown, slidingly and rotationally fits the tool post 10 to be centered thereby. Threadedly mounted upon the collar 24 and, therefore, concentric with the tool post is a generally rectangular or square-topped frame 30, having a horizontal, rectangular groove 32, cut along each of its four sides, and being thus continuous about the outside of the frame.

The upper face 34 of the frame is provided with a series of vertical, tapped openings 36, leading into the groove 32, immediately below, each opening mounting therein an externally threaded screw 38 adapted to bear against a tool lodged in said groove and thereby to lock the same firmly in position. Conveniently these screws may be formed with polygonal sided, open topped recesses in their head so as to be engageable by insertion therein of a correspondingly shaped, right angle wrench, such as an "Allen head" wrench.

The screws are uniformly spaced apart and arranged in a straight line adjacent each edge so that two or more of the screws may bear against the same tool 39 according to how the latter is positioned in the groove. With a square-topped, eight apertured frame such as that shown in Figure 1, four tools may be mounted by two screws each, with their tool edges projecting from consecutive corners in either a generally clock-wise or counter clock-wise direction as the case may be. If the tool handle is of shorter length than will span the spacing between two adjacent screws, of course it can be held by only one screw, and likewise the number of screws in my frame need not be limited to eight nor the shape thereof be square, so that by such variations of construction and operation the number of tools which may be mounted therein can be increased considerably. In addition, it will be noted that the provision of a straight edged frame and a correspondingly shaped groove enables the rectangular tool handle clamped therealong to be readily aligned, by rotation of the frame, with the lathe or work piece since the straight edge of the holder furnishes an easy reference line.

The upper face of the frame is provided with an annular recess 40, centered about the vertical aperture 42 of the frame, so that a generally rectangular, radius-ended, clamp bar 44 may be laid thereacross within the horizontal slot 14 of the tool post and the locking screw 16 tightened down upon its upper face. The clamp bar is of a length approximating the diameter of the recess and its opposite ends are thus correspondingly curved so that the bar may be inserted in any bisecting position of the recess, or freely rotated therein when not held by the screw. Accordingly, the tool holder, consisting of frame 30 and thimble 22, can be rotated about the tool post after loosening the screw 16 so that the holder can be swung to the desired operating position without removing the clamp bar from its recess 40. In addition, upon loosening the vertical screw from the clamp bar the vertical position of the mounted tools may be adjusted by rotating the frame up or down on the threaded thimble.

Accordingly it will be seen that I have produced a highly useful and efficient tool holder which possesses the particular advantages of being applicable in connection with a conventional tool post and is of simple construction and economic operation, as well as great adjustability. Thus the old fashioned rocker arm may be advantageously superceded by use of my tool holder to raise and lower the position of the tool. In addition, my holder may be used to mount a plurality of tools at the same time, which can be used in any sequence, while at the same time any individual tool may be removed or replaced from the holder, without effecting the mounting of any other tool.

While I have illustrated and described what I now regard as the preferred embodiment of my invention, the construction is, of course, subject to modifications without departing from the spirit and scope of my invention. I therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A multiple tool holding device, having a central opening for mounting over and use with a tool post of the type which has a transverse slot and a vertical tightening screw insertable into said slot, which device includes; a flat-bottomed thimble having an upwardly extending collar slidingly and rotationally fitting the tool post, the lower flat face of the thimble being adapted to rest upon the upper surface of a lathe compound mounting the tool post; a polygonal sided frame having a central opening and mounted on said collar and having a continuous rectangular groove formed about its outer sides and having a series of vertical tapped openings between the upper face of said frame and said groove, said frame having an annular recess in said upper face concentric with and surrounding the central opening of the frame; screws individually mounted in the several of said tapped openings so as to bear against the handle of a tool inserted in said groove therebeneath; and a loose clamp bar insertable through the slot of said tool post and having its ends extending into opposite sides of said recess so that the tightening screw, by bearing against said bar, clamps the thimble to the lathe compound and non-rotationally locks the frame and the tool carried thereby.

2. A multiple tool holding device, having a central opening for mounting over and use with a tool post of the type which has a transverse slot and a vertical tightening screw insertable into said slot, which device includes: a flat-bottomed thimble having an upwardly extending externally threaded collar slidingly and rotationally fitting the tool post, the lower flat face of the thimble being adapted to rest upon the upper surface of a lathe compound mounting the tool post; a square topped, internally threaded frame adjustably mounted on the external threads of said collar and having a continuous rectangular groove formed about its outer sides and having a series of vertical tapped openings between the upper face of said frame and said groove, said frame having an annular recess in said upper face concentric with and surrounding the central opening of the frame; screws individually mounted in the several of said tapped openings so as to bear against the handle of a tool inserted in said groove therebeneath; and a loose clamp bar insertable through the slot of said tool post and having its ends extending into opposite sides of said recess so that the tightening screw, by bearing against the same, acts to clamp said holder on the lathe compound.

3. A tool holder for operative association with a conventional cylindrical tool post that has an end-adjustable screw adapted for clamping a tool conventionally disposed in a transverse slot provided in said post, said tool post extending from a flat support, said tool holder comprising two threadedly engaged members having a common opening therethrough to slidingly and rotationally fit over the tool post, one member comprising a thimble having flat engagement with the support for the tool post, the other member being adjustable toward and from said support and relative to the thimble, said other member comprising a polygonally-shaped frame having outer peripheral slots therein, said slots defining upper and lower flanges and receptive of one or more tools, screw means carried by one flange for rocking said tools against the other flange, said frame having an annular seat formed in its upper face and concentric with the opening therethrough, and a bar extending through the slot in the tool-holder and having its ends disposed in opposed portions of said seat, the end-adjustable screw of the post being adapted to press against said bar to thereby lock the tool-holder, in rotationally adjusted position, on the support.

FRANK T. COLSEN.

REFERENCES CITED

The following references are of record in the file of this patent:

UNITED STATES PATENTS

| Number | Name | Date |
| --- | --- | --- |
| 939,976 | Carr | Nov. 16, 1909 |
| 1,018,525 | Smith | Feb. 27, 1912 |
| 2,324,603 | Strabl | July 20, 1943 |
| 2,373,535 | Brown | Apr. 10, 1945 |